Patented Feb. 22, 1949

2,462,738

UNITED STATES PATENT OFFICE 2,462,738

SYNTHESIS OF ORGANIC OXYGEN-CONTAINING COMPOUNDS

William F. Gresham, Wilmington, Del., assignor to E. I. du Pont de Nemours & Company, Wilmington, Del., a corporation of Delaware No Drawing. Application May 17, 1946, Serial No. 670,524

6 Claims. (Cl. 260—488)

This invention relates to the synthesis of organic oxygen-containing compounds, and more particularly to the synthesis of oxygen-containing compounds by reaction between carbon monoxide and alcohols or dialkyl ethers in the presence of certain catalysts as hereinafter set forth. The invention, in more specific aspects, is directed to the synthesis of methyl acetate by reaction between methanol and carbon monoxide. The reaction whereby methyl acetate is obtained in accordance with this invention may be written as follows:

$$2CH_3OH + CO = CH_3COOCH_3 + H_2O$$

It has been known heretofore that methyl acetate can be prepared by reaction between methanol and carbon monoxide in the presence of certain catalysts, especially volatile halides such as boron trifluoride and the like. Also, it has been known that the lower aliphatic alcohols may react with carbon monoxide to form either carboxylic acids or esters thereof in the presence of catalysts such as various silicotungstates, borates, phosphates, and the like. In certain instances it has been disclosed that the nickel, cobalt and iron salts of specific oxy acids may be employed as catalysts for reaction between methanol and carbon monoxide. Nickel and cobalt halides have been mentioned as substances which may be employed simultaneously with other materials such as boron fluoride, as catalysts for this reaction, according to the prior art.

In general, all of the aforesaid processes for the reaction of methanol with carbon monoxide either involved the use of highly corrosive catalytic materials, or else gave rise to comparatively low yields of the desired products, such as acetic acid or methyl acetate.

An object of this invention is to provide an improved process for reacting alcohols or ethers with carbon monoxide. Another object is to provide a process whereby methyl acetate can be obtained from methanol and carbon monoxide in high yield without the use of highly corrosive catalytic materials. Other objects of the invention will appear hereinafter.

These objects are accomplished in accordance with this invention by reaction of an alcohol or ether, and more particularly methanol, with carbon monoxide in the presence of a cobalt salt of an organic carboxylic acid as catalyst. The corresponding compounds of nickel in certain instances also have been found to be operative, according to the invention, but outstanding results are obtained with the aforesaid cobalt-containing catalysts. It has been discovered, in accordance with the invention, that hydrogen has a highly beneficial effect on said reaction. In general, the catalyst should be diffused throughout the reaction mixture, i. e. it should be dispersed or dissolved therein, or else should be in a suitable particulate form, so that effective contact between the catalyst and the reacting substances can be obtained.

The process of the invention is usually carried out at a temperature of about 100° to 325° C., preferably about 200° to 300° C. Superatmospheric pressures are generally employed. Best results are obtained at pressures within the range of about 200 to 1500 atmospheres, preferably about 400 to 1000 atmospheres.

In the practice of the present invention it has been observed that the catalysts disclosed herein direct the reaction between methanol and carbon monoxide quite exclusively to the formation of methyl acetate, rather than acetic acid, especially when conversion is kept fairly low, i. e., when an excess of the methanol reactant is present. The ester is formed selectively even when the reaction mixture contains relatively large amounts of water.

Furthermore, as stated above, it has been discovered in accordance with the invention that relatively small amounts of hydrogen have a highly beneficial effect upon the rate of formation of methyl acetate from methanol and carbon monoxide in the presence of the aforesaid catalysts (compare Examples 2 and 3). It is entirely possible that this may be due to the intermediate formation of a hydride carbonyl which may be one of the active ingredients in the reaction mixture. This beneficial effect of hydrogen is noted even when hydrogen is present in relatively low concentrations. In general, it is observed that the beneficial effect increases with hydrogen concentration up to a carbon monoxide:hydrogen molal ratio of about 3:1, while higher concentrations of hydrogen do not result in any appreciably increased beneficial action. Both the carbon monoxide and hydrogen employed in the practice of the invention may be produced in situ, by decomposition of methtanol; thus, in one embodiment, the invention may be practiced by heating methanol in a closed vessel at methanol decomposition temperatures in the presence of a cobalt acetate catalyst, whereby methyl acetate is produced directly from methtanol, even without the use of added carbon monoxide.

This invention is illustrated further by means of the following examples.

*Example 1.*—A mixture containing 128 grams of methanol, 36 grams of water, and 12 grams of cobalt acetate was heated in a silver-lined shaker tube for 35 minutes at a temperature of 220° to 225° C. with carbon monoxide under a pressure of 650 to 800 atmospheres. The conversion of methanol to methyl acetate was 26.5%, yield being 59%.

*Example 2.*—A mixture containing 64 grams of methanol, 5 grams of cobalt acetate, and 72 grams of water was heated in a silver-lined shaker tube with carbon monoxide under a pressure of 600 to 710 atmospheres at a temperature of 220°. The rate of reaction was such that a 7% conversion to methyl acetate was obtained in 0.5 hr., the yield of methyl acetate base on methanol consumed being excellent.

*Example 3.*—Example 2 was repeated using in place of carbon monoxide a hydrogen:carbon monoxide mixture having a $H_2:CO$ ratio of 1:3. The rate of conversion of methanol to methyl acetate was 25% in 0.5 hr., the yield of methyl acetate based on methanol consumed being excellent.

*Example 4.*—The following table sets forth the results obtained by heating methanol with carbon monoxide under the stated conditions. The experiments were made by heating the reaction mixture in a copper-lined shaker tube having a capacity of about 325 c. c. at the stated temperatures and pressures, and thereafter separating a methyl acetate fraction from the resulting mixture by distillation.

The process of the present invention may be performed either batchwise or continuously. In general, the invention is practiced by introducing into a pressure-resistant vessel a reaction mixture comprising methanol, carbon monoxide, and cobalt salt of an organic carboxylic acid; the reaction mixture is heated under the aforesaid conditions of temperature and pressure, after which methyl acetate is separated from the resultant product by any suitable method, such as simple distillation. The residue may be recycled with added methanol if desired.

I claim:

1. A process for the synthesis of organic oxygen-containing compounds which comprises introducing into a pressure-resistant vessel a reaction mixture comprising a saturated aliphatic monohydric alcohol containing not more than three carbon atoms per molecule, carbon monoxide and a diffused cobalt acetate catalyst, heating the said reaction mixture at a temperature of 100° to 325° C. under superatmospheric pressure, and thereafter separating from the resulting reaction product the organic oxygen-containing compounds produced by the said reaction.

2. A process for the synthesis of methyl acetate which comprises introducing into a pressure-resistant vessel a reaction mixture comprising methanol, carbon monoxide and a dissolved cobalt acetate catalyst, heating the said reaction mixture at a temperature of 200 to 300° C. under a pressure of 200 to 1500 atmospheres, and thereafter separating methyl acetate from the resulting reaction product.

*Preparation of methyl acetate*

| Run No. | Weight of Methanol Charged, grams | Ratio $H_2:CO$ | Catalyst | Other Ingredients of the Charge | Pressure (atm.) | Temperature, C° | Rate of Conversion of Methanol to Methyl Acetate (per cent converted in first hour) |
|---|---|---|---|---|---|---|---|
| 1 | 96 | 1:3 | cobalt acetate tetrahydrate, 10 grams. | dimethyl ether, 69 grams. | 700 to 800 | 220 to 230 | 13.8. |
| 2 | 192 | 1:3 | ....do.... | none | 700 to 800 | 220 to 230 | 15.8. |
| 3 | 192 | 2:1, formed by decomposition of methanol in situ | cobalt acetate, 12 grams. | ....do.... | 13 to 16 | 220 to 225 | 2.5 |
| 4 | 160.2 | 2:1 | cobalt acetate tetrahydrate, 10 grams. | ....do.... | 620 to 820 | 150 to 180 | (3.1% in 0.2 hrs.) |

It is to be understood that the foregoing examples are illustrative only and that the reaction conditions may be varied somewhat without departing from the spirit and scope of the invention. Catalyst concentrations do not seem to be particularly important; small quantities are sufficient and satisfactory reaction rates are obtained when the quantity of catalyst is about 2% to 10%, based on the total weight of the liquid reaction mixture. The temperature is somewhat more critical. At temperatures of about 220° to 240° C., rates of conversion are significantly higher than at temperatures below about 200° C. At temperatures above 300°, acetaldehyde and propionaldehyde are formed from methanol and carbon monoxide, and decreased yields of methyl acetate are obtained.

In general, alcohols such as ethyl alcohol, isopropanol, etc., may be substituted for methanol in the practice of the invention, but, the results obtained with these higher alcohols are less satisfactory than those obtained with methanol. Ethanol is rather rapidly converted to diethyl ether under the reaction conditions. Isopropanol gives rise to oxygenated compounds, but it appears that side reactions decrease the yield of ester or acid thus obtained. The dialkyl ethers also react with carbon monoxide under the conditions herein set forth.

3. A process for the synthesis of methyl acetate which comprises introducing into a pressure-resistant vessel a reaction mixture comprising methanol, carbon monoxide, hydrogen, and a dissolved cobalt acetate catalyst, heating the said reaction mixture at a temperature of 100° C. to 325° C. under a pressure of 200 to 1500 atmospheres, and thereafter separating methyl acetate from the resulting reaction product.

4. A process for the synthesis of methyl acetate which comprises introducing into a pressure-resistant vessel a reaction mixture comprising methanol, water, carbon monoxide, and a catalytic quantity of dissolved cobalt acetate, heating the said reaction mixture at a temperature of 100° to 325° C. under a pressure of 200 to 1500 atmospheres, and thereafter separating methyl acetate from the resulting reaction product.

5. The process set forth in claim 3 in which the molal ratio of $H_2:CO$ does not exceed 1:3.

6. A process for the synthesis of methyl acetate which comprises introducing into a pressure-resistant vessel a reaction mixture comprising methanol, carbon monoxide, hydrogen and a dissolved cobalt acetate catalyst, the initial molal ratio of $H_2:CO$ being not in excess of 1:3, heating the said reaction mixture at a temperature of 100° to 325° C. under pressure of 200 to 1500 atmospheres, and thereafter separating methyl acetate from the resulting reaction mixture.

WILLIAM F. GRESHAM.

REFERENCES CITED

The following references are of record in the file of this patent:

UNITED STATES PATENTS

| Number | Name | Date |
|---|---|---|
| 1,562,480 | Wietzel et al. | Nov. 24, 1925 |
| 1,784,583 | Dreyfus I | Dec. 9, 1930 |
| 1,927,414 | Oxley | Sept. 19, 1933 |
| 1,946,256 | Woodhouse | Feb. 6, 1934 |
| 1,996,101 | Dreyfus II | Apr. 2, 1935 |
| 2,117,554 | Hale | May 17, 1938 |
| 2,162,459 | Loder | June 13, 1939 |